United States Patent
Carlebach et al.

(10) Patent No.: US 9,480,246 B1
(45) Date of Patent: Nov. 1, 2016

(54) DETACHABLE LINE CARTRIDGE SYSTEM

(71) Applicants: Adam Carlebach, Piedmont, CA (US); Timothy Odell, Bartlett, TN (US); KwunKit Ho, San Jose, CA (US); Hsin Han Chiang, Mountain View, CA (US)

(72) Inventors: Adam Carlebach, Piedmont, CA (US); Timothy Odell, Bartlett, TN (US); KwunKit Ho, San Jose, CA (US); Hsin Han Chiang, Mountain View, CA (US)

(73) Assignee: Better Fishtrap, Inc., Piedmont, CA (US)

( * ) Notice: Subject to any disclaimer, the term of this patent is extended or adjusted under 35 U.S.C. 154(b) by 0 days.

(21) Appl. No.: 15/162,333

(22) Filed: May 23, 2016

Related U.S. Application Data

(60) Provisional application No. 62/260,134, filed on Nov. 25, 2015.

(51) Int. Cl.
*A01K 89/01* (2006.01)

(52) U.S. Cl.
CPC ... *A01K 89/01921* (2015.05); *A01K 89/01931* (2015.05)

(58) Field of Classification Search
CPC ............. A01K 89/01; A01K 89/0113; A01K 89/016; A01K 89/0162
USPC ...................................... 242/588.3, 601, 607
See application file for complete search history.

(56) References Cited

U.S. PATENT DOCUMENTS

| | | | | |
|---|---|---|---|---|
| 2,126,227 A | * | 8/1938 | Stanley | A01K 89/016 192/14 |
| 2,925,229 A | * | 2/1960 | Wood | A01K 89/01 242/231 |
| 3,565,362 A | * | 2/1971 | Lilland | A01K 89/01 242/118.4 |
| 4,549,702 A | * | 10/1985 | Councilman | A01K 89/027 242/246 |
| 5,755,391 A | * | 5/1998 | Sacconi | A01K 89/016 242/312 |
| 6,065,699 A | * | 5/2000 | Sacconi | A01K 89/033 242/286 |
| 6,149,089 A | * | 11/2000 | Matsuda | A01K 89/01 242/246 |
| 6,712,300 B2 | | 3/2004 | Carlebach et al. | |
| 7,438,010 B2 | * | 10/2008 | Lyman | B65H 49/08 112/302 |
| 9,010,676 B2 | * | 4/2015 | DiCicco | A01K 97/06 242/388.6 |
| 2004/0061011 A1 | * | 4/2004 | Gilmore | A01K 89/016 242/317 |
| 2006/0151660 A1 | * | 7/2006 | Stringer | B65D 85/672 242/588.3 |
| 2010/0181406 A1 | * | 7/2010 | Kang | A01K 89/016 242/267 |
| 2012/0126050 A1 | * | 5/2012 | Land | B65H 54/20 242/474.8 |
| 2014/0077023 A1 | * | 3/2014 | Foreman | B65H 35/002 242/588.3 |
| 2014/0263791 A1 | * | 9/2014 | Sabtu | A01K 89/01 242/224 |

\* cited by examiner

*Primary Examiner* — Emmanuel M Marcelo
(74) *Attorney, Agent, or Firm* — Fish & Richardson P.C.

(57) ABSTRACT

Methods, apparatus, and products for a detachable line cartridge system. A detachable line cartridge system has a spool base and a detachable flange assembly having an aperture and a locking mechanism that engages with the spool base, wherein the flange assembly is configured to secure a line cartridge to the spool base.

21 Claims, 9 Drawing Sheets

US 9,480,246 B1

DETACHABLE LINE CARTRIDGE SYSTEM

CROSS-REFERENCE TO RELATED APPLICATION

This application claims priority to U.S. Provisional Application Ser. No. 62/260,134, filed Nov. 25, 2015, and entitled "Detachable Spool Cartridge". The entirety of the foregoing application is hereby incorporated by reference.

BACKGROUND

This specification relates to spinning fishing reels.

Conventional spinning fishing reels include a spool for holding the fishing line. It is often desirable for a user to change the line on the spool to a line of different strength, length, or type, depending on changing conditions, weight of bait or lures, and size of fish being sought.

With conventional spinning reels, there are two primary ways in which the user can change fishing line on the spool. One method involves manually unwinding the old line from a fixed spool, tying on the new line, and then winding the new line onto the spool with the reel. This is a tedious a time consuming process.

A second method involves buying a spare spool and winding a different line on the spare spool as above. Conventional spools are themselves generally complicated, expensive parts to manufacture and are not designed to be changed often. The primary method employed for attaching a spare spool to a spinning reel is to seat the spool on the reel's shaft screw. Care must be given to aligning the drag washers. The spool is held onto the reel by installing the drag knob, and tightening it to the desired tension. Removal of the spool is accomplished by loosening and removing the drag knob, and lifting the spool off of the shaft screw.

SUMMARY

This specification describes an interchangeable fishing line cartridge system that is compatible with conventional spinning reels and which allows a user to quickly and easily change out one line cartridge for another by simply removing a flange assembly that holds the line cartridge to a spool base.

Particular embodiments of the subject matter described in this specification can be implemented so as to realize one or more of the following advantages. An interchangeable fishing line cartridge system makes changing fishing line on a spinning reel much easier. Users can more quickly and easily change their fishing line on spinning reels, thereby enabling users to more easily experiment with different line types having different strengths or made of different materials. When a line becomes snagged, twisted, or otherwise unusable, users can easily continue fishing by simply removing the old line cartridge and attaching a new untangled line cartridge. The detachable line cartridge system is compatible with existing spinning reels. Thus, users need not buy all new equipment in order to enjoy the benefits of the detachable line cartridges. The detachable line cartridge system can be installed by a user with little effort and virtually no expertise. Manufacturers of fishing line can sell prewound cartridges of fishing line, and users who buy such cartridges can quickly and easily install them on their fishing reels.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
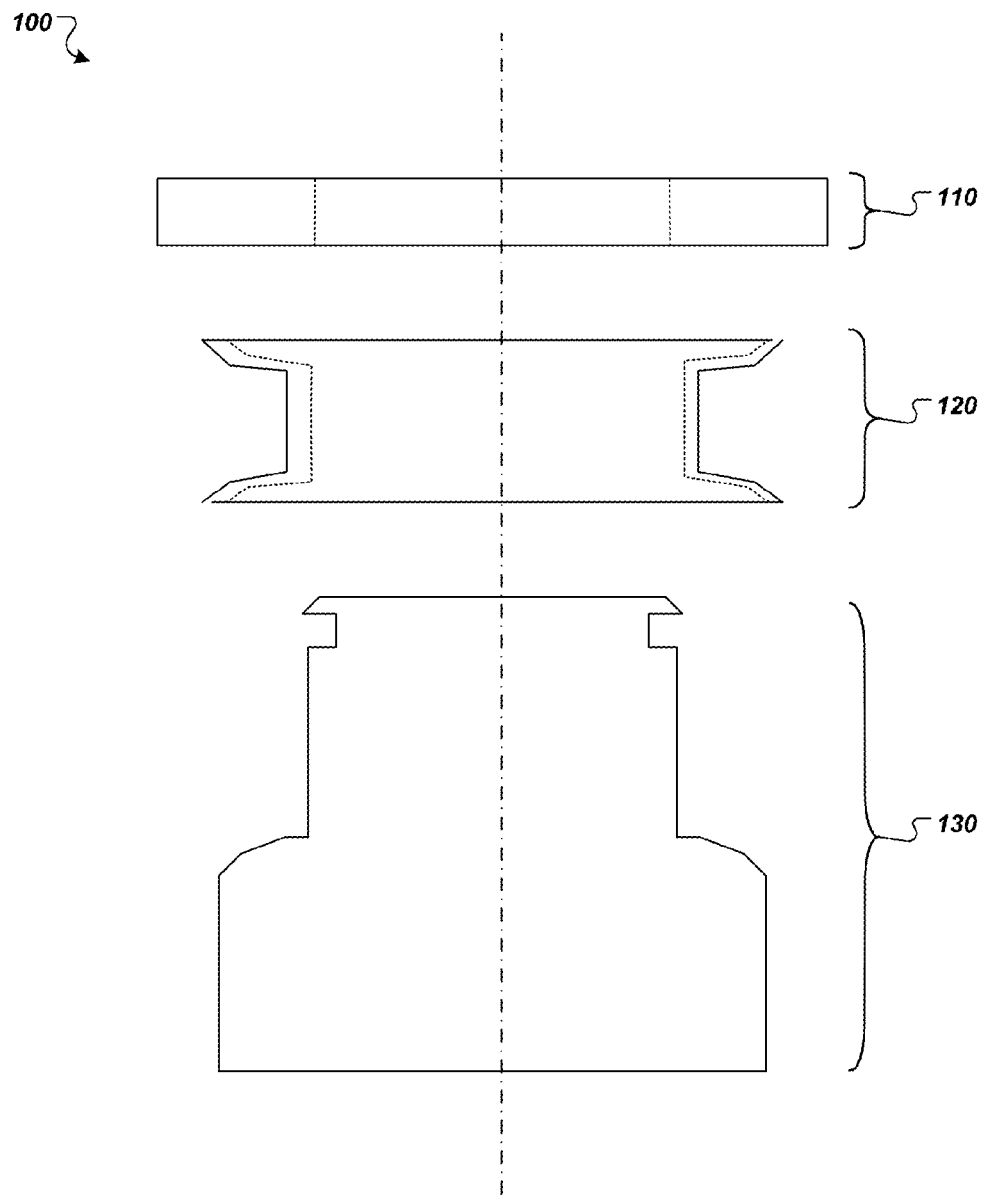
FIG. 1A is a cross-sectional view of a detachable line cartridge system.

FIG. 1A is a cross-sectional view of a detachable line cartridge system 100. The detachable line cartridge system 100 includes a base 130, a line cartridge 120, and a flange 110. The detachable line cartridge system 100 is compatible with conventional spinning reels and provides a user with the ability to quickly and easily change fishing line on a spinning reel. In particular, the base 130 can be the base of a conventional spinning reel, or the base 130 can be mounted to a conventional spinning reel.

Rather than rewinding the line around a spool, the detachable line cartridge system 100 allows a user to easily simply replace one line cartridge with another.

The line cartridge 120 is configured to be mated to the base 130. In other words, the line cartridge 120 has an aperture that fits onto the base 130.

The flange 110 engages with the base 130 to hold the line cartridge 130 onto the base. A user can release and remove the flange 110 in order to remove the line cartridge 120 from the base 130. The user can then replace the line cartridge 120 with another line cartridge, e.g., another line cartridge having prewound fishing line.

Figure 1B:
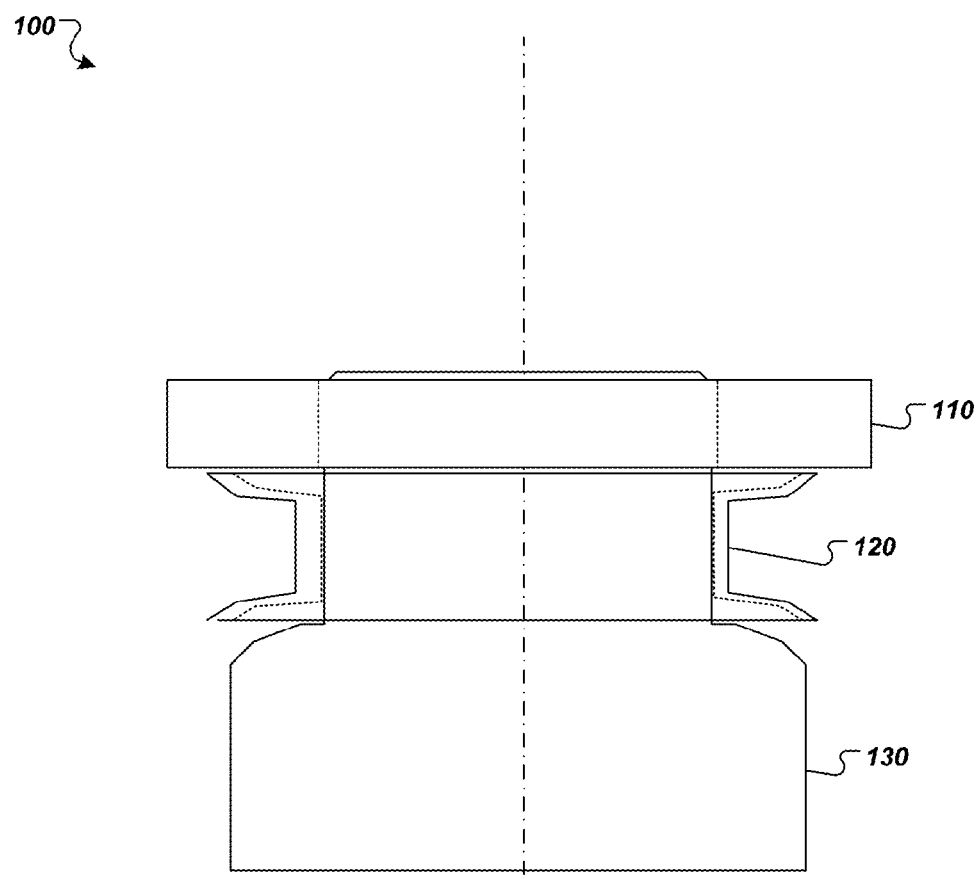
FIG. 1B is another cross-sectional view of a detachable line cartridge system.

FIG. 1B is another cross-sectional view of a detachable line cartridge system 100. FIG. 1B illustrates the line cartridge 120 being mated to the base 130 and held on with the flange 110. When the line cartridge 120 is held onto the base 130 by the flange 110, a fishing reel can use line on the line cartridge 120 just as if the line were on a conventional spool.

Figure 1C:
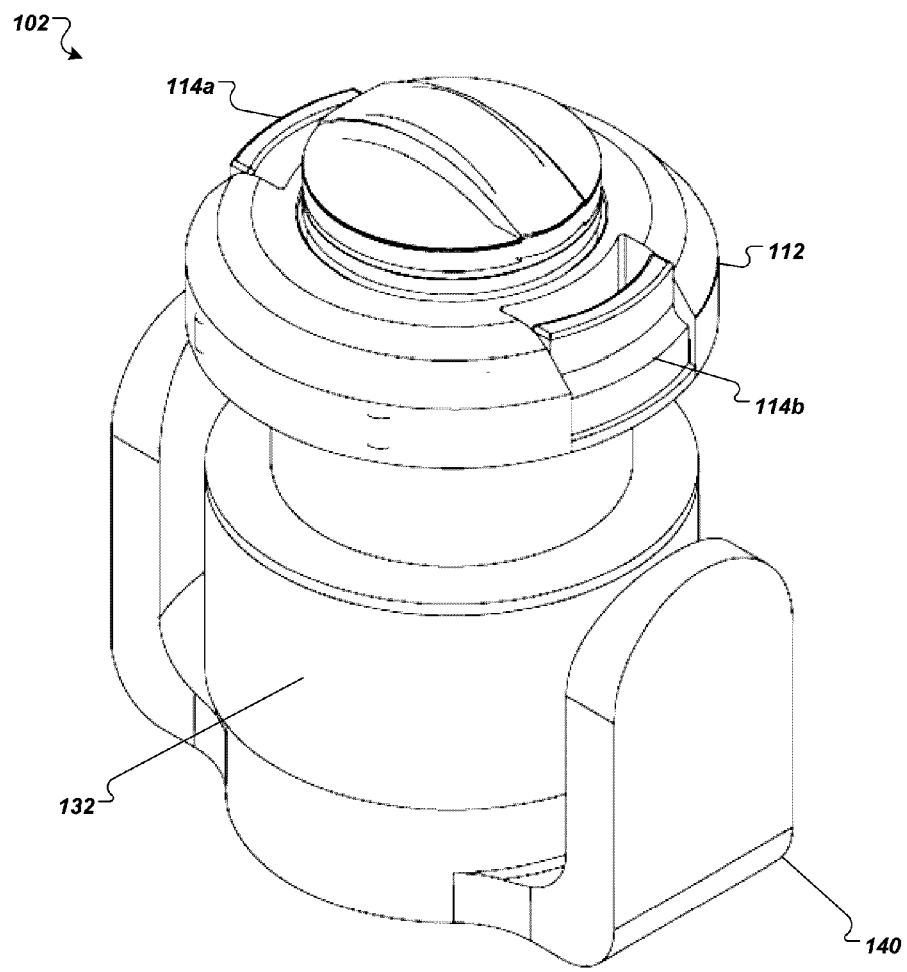
FIG. 1C is a perspective view of a detachable line cartridge system.

FIG. 1C is a perspective view of a detachable line cartridge system 102. FIG. 1C illustrates a base 132 being mounted between a rotor assembly 140. A flange 112 engages the base 132. The flange 112 can be disengaged from the base 132 using buttons 114a-b. For example, a user can simultaneously push buttons 114a-b to remove the flange 112 from the base 132, which allows the user to add or replace a line cartridge.

Figure 2:
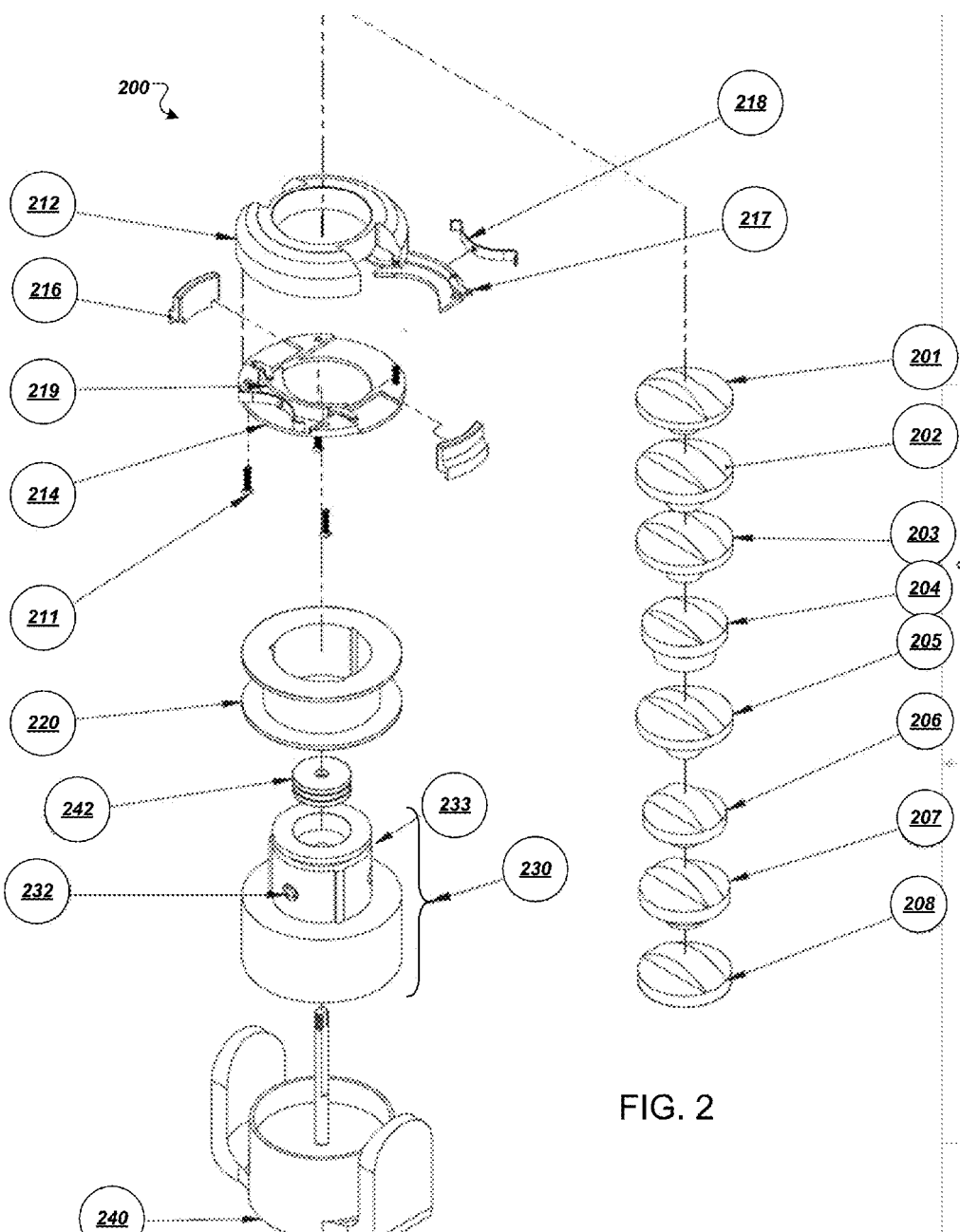
FIG. 2 is an exploded view of an example detachable line cartridge system.

FIG. 2 is an exploded view of an example detachable line cartridge system 200. A rotor assembly 240 is a component of conventional spinning reels. The rotor assembly 240 typically has a rotor that rotates around a fixed spool assembly in order to wind line around the reel, e.g., when a user is reeling in a fish.

The rotor assembly 240 includes a shaft screw that is used to adjust the drag of the reel in combination with a drag knob. FIG. 2 illustrates a variety of drag knobs 201-208. A user can adjust the drag by screwing a drag knob onto the shaft screw tighter or looser. A drag mechanism in the rotor assembly allows the spool assembly to rotate to unwind line when enough tension is applied to the line of a spinning reel, e.g., when a fish pulls on the line. The spool assembly rotates to unwind line at a rate controlled by how tightly the drag knob is mounted to the shaft screw.

The rotor assembly 240, shaft screw, and drag knobs 210-208 are components of conventional spinning reels that are compatible with the detachable cartridge system 200 that will now be described.

The detachable line cartridge system 200 includes a base 230 that is compatible with the rotor assembly 240. Washers 242 facilitate rotation of the base 230 around the shaft screw using the drag mechanism of the rotor assembly 240.

A line cartridge 220 has an inner aperture or cavity, an upper lip, and a lower lip, and vertical grooves that mate to vertical guides of the base 10. The line cartridge 220 can be prewound with fishing line, e.g., by a manufacturer at the manufacturer's location, to allow users to quickly and easily change the fishing line on a spinning reel.

In some implementations, the line cartridge 220 is intended to be disposable or recyclable. Thus, the line cartridge itself can be made of plastic, a light-weight metal, e.g., aluminum alloy, or any other appropriate light-weight material. On the other hand, the base 230 and the flange assembly can be made of more permanent materials, e.g., stainless steel or aluminum alloy.

The base 230 has integrated spring-loaded ball bearings 232 that facilitate installation or removal of the line cartridge 220. In other words, the spring-loaded ball bearings 232 apply an outward force that facilitates securing the line cartridge 220 to the base 230.

The line cartridge 220 is secured to the base 230 by a flange assembly, which is made up of a flange housing 212, a flange bottom 214, a pair of buttons 216, a pair of springs 218, a pair of retainers 219, four linkers 217, and screws 211. The flange assembly is a removable component. In other words, the flange assembly is designed to be removed as a single piece, thereby allowing a user to also remove a line cartridge from the reel. In some implementations, the flange assembly can be removed from the reel while the drag knob is still attached to the drag screw of the rotor assembly 240. In other words, a user need not remove a drag knob to remove the flange assembly and the line cartridge 220.

The flange assembly has a release mechanism that secures the line cartridge 220 to the base 230. The flange assembly of the detachable line cartridge system 200 can use any appropriate mechanism for securing the line cartridge 220 to the base 230. The flange assembly shown in FIG. 2 uses a pair of oppositely oriented buttons 216, which a user can engage to operate the release mechanism. However, a variety of other release mechanisms can also be used that allow the flange assembly to be secured to and removed from the base 230.

In this example, the flange assembly has a flange housing 212, a flange bottom 214, a pair of corresponding springs 218, a pair of corresponding buttons 216, a pair of corresponding retainers 219, and linkers 217 that connect the retainers 219 to the flange bottom 214. The components of the example flange assembly are held together by screws 211, although any appropriate fastening mechanism can also or alternatively be used.

The flange assembly has an aperture that allows the flange assembly to be mated to the base 230 in order to secure the line cartridge 220 to the base 230.

The retainers 219 slide relative to the flange bottom 214 and the flange housing 212 using the linkers 217. The retainers 219 slide inward toward and slide outward away from the aperture of the flange assembly, thereby increasing and decreasing the effective diameter of the aperture.

The springs 218 maintain an inward force on the retainers 219. When the flange assembly is mated to the base 230, the springs 218 maintain an inward force that causes the inward edge of the retainers 219 to remain engaged with a groove 233 on the top of the base 230. This inward force and engagement with the base 230 secures the flange assembly to the base 230.

In this position, which will be referred to as the locked position, the retainers 219 of the flange assembly remain engaged in the groove 233 of the base 230 by the force of the springs 218. In the locked position, the flange assembly holds the line cartridge 220 on the spool assembly.

The buttons 216 are used to transition the flange assembly from the locked position to a release position. In the release position, a user pushes the buttons 216 inward. This causes the buttons 216 to engage the linkers 217, causing the linkers 217 to slide the retainers 219 back against the inward force applied by the springs 218. This therefore causes the retainers 219 to slide outward from the aperture of the flange assembly and to disengage from the groove 233 on the base 230. The flange assembly can then be removed, as well as the line cartridge 220.

A user can then install a replacement line cartridge on the base 230, or the same line cartridge 220. To do so, the user mates the replacement line cartridge to the base 230 and secures the replacement line cartridge to the base 230 by attaching the flange assembly to the base 230 and engaging the locking mechanism of the flange assembly.

In this example, as the flange assembly is mated to the base 230, the shape of the base 230 causes the retainers 219 to slide outward away from the aperture of the flange assembly until the retainers 219 reach the groove 233 on the base 230. At that point, the recessed diameter of the groove 233 and inward force applied by the springs 218 causes the retainers 219 to engage with the groove 233 on the base 230.

When the retainers 219 engage with the groove 233 on the base 230, the flange assembly assumes the locked position.

The user can then adjust a drag knob, e.g., drag knob 201, on the shaft screw of the rotor assembly 240 in order to adjust the drag of the drag mechanism of the rotor assembly 240. The drag knob can either be manufactured and sold as part of the detachable cartridge system 200 or the user can simply reuse a drag knob from a conventional spinning reel.

The user can then use the fishing line on the replaced line cartridge to fish. At this point, the flange assembly and line cartridge 220 are locked to the base 230 and will not come off the base 230 due to ordinary fishing activities, e.g., casting, reeling, and pulling on the line. In addition, when the fishing line experiences tension, e.g., due to a fish pulling on the line, the drag mechanism will allow line from the line cartridge 220 to be released.

Figure 3:
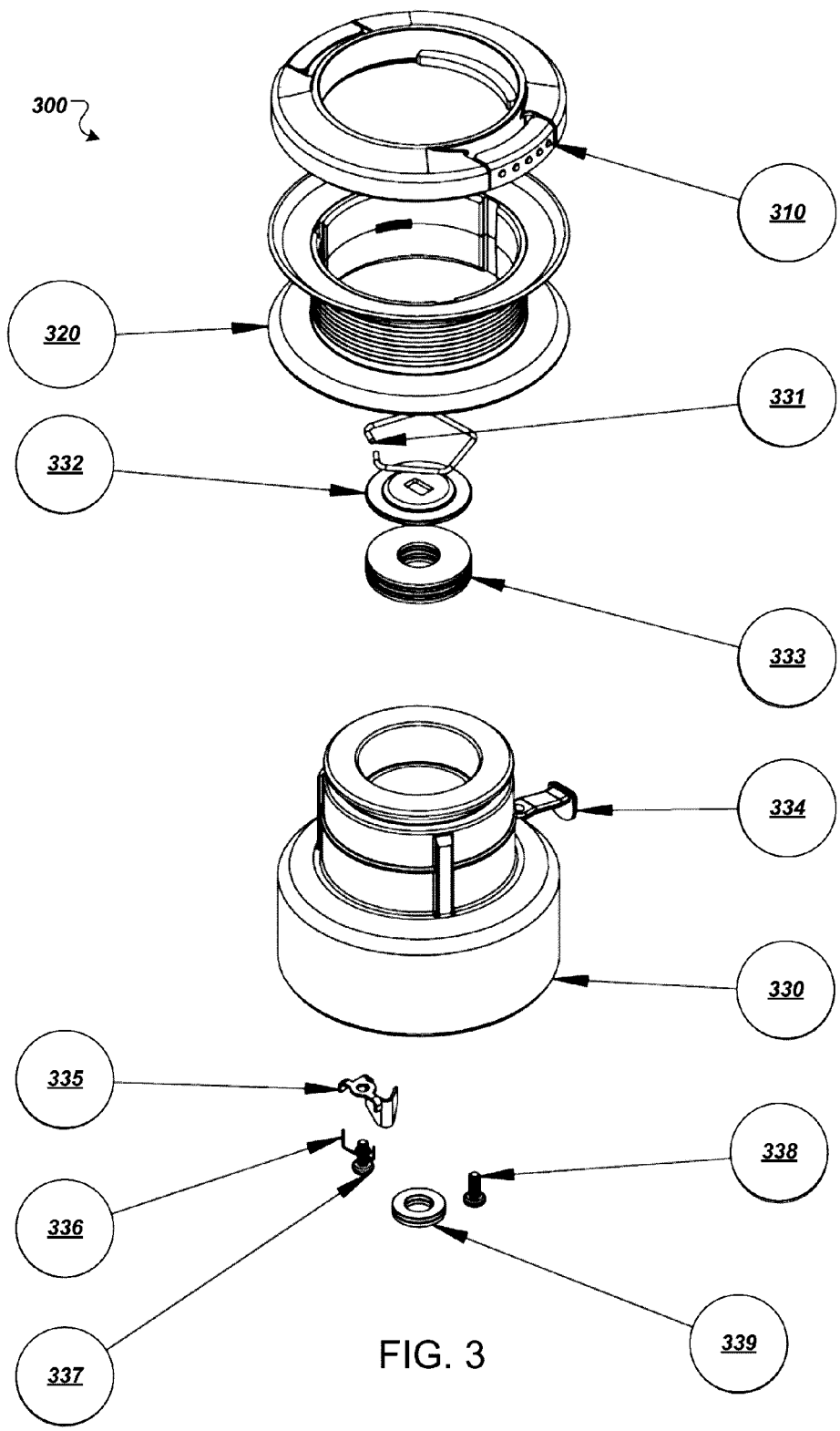
FIG. 3 is an exploded view of another example detachable line cartridge system.

FIG. 3 is an exploded view of another example detachable line cartridge system 300. The system 300 includes a flange 310, a line cartridge 320, and a base 330. FIG. 3 illustrates additional components for operation of a fishing reel with a detachable line cartridge system, including screws 337-338, washers 339, a torsion spring 336, and a clicker 335. The clicker 335 is a device that makes an audible sound when the base rotates due to tension on the line. The system 300 also includes a detent 334 used to clamp loose fishing line when the reel is not being used.

The system 300 also includes a drag mechanism with a wire retainer 331, a drag washer 332, and washers 333. The drag washer 332 is typically made of carbon fiber, and provides drag friction when rotated against the washers 333. The wire retainer 331 holds the drag washers 332 and 333.

Figure 4:
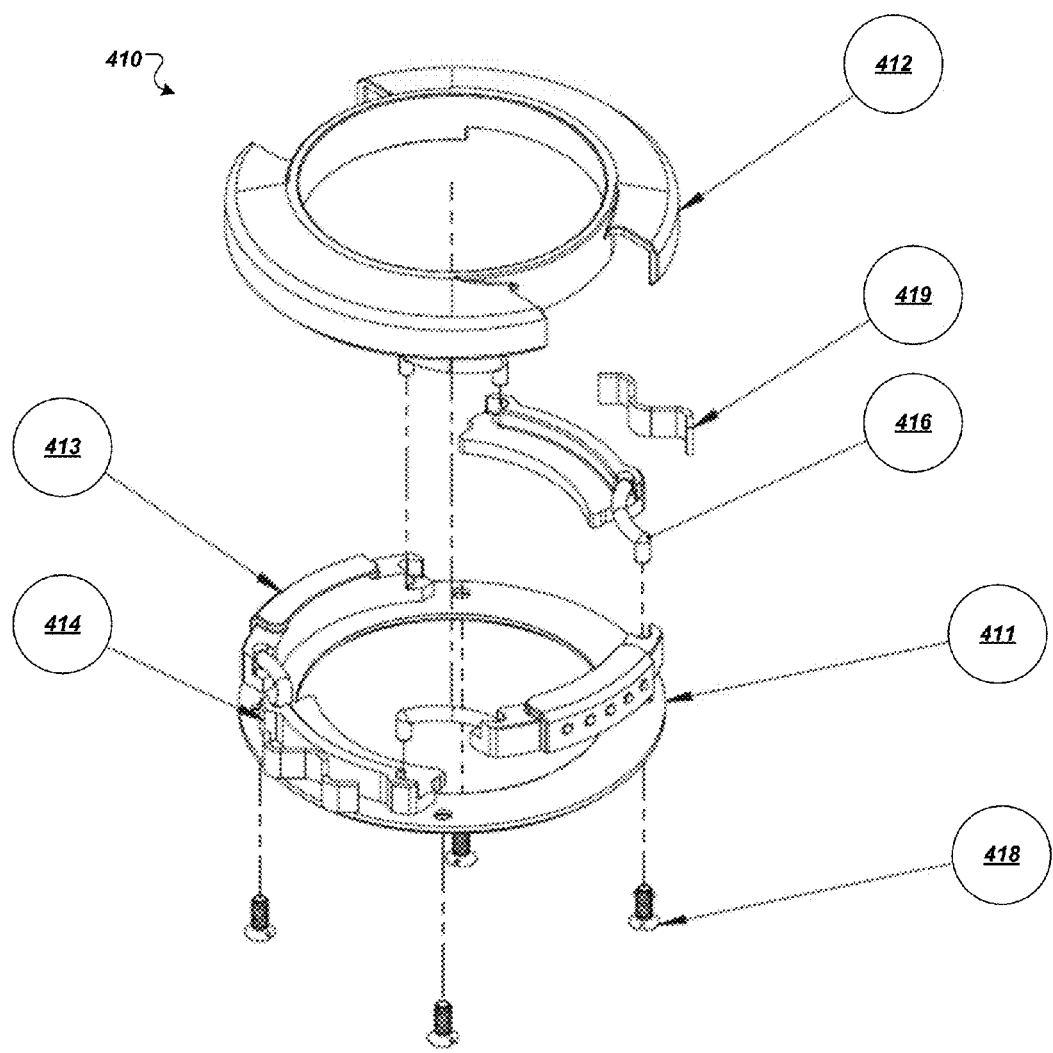
FIG. 4 is an exploded view of an example flange.

FIG. 4 is an exploded view of an example flange 410. The flange 410 has a flange housing 412 and a flange bottom 411 that are held together with screws 418.

The flange 410 also includes a pair of buttons 413 that engage linkers 416 to cause retainers 414 to slide toward and away from an aperture in the flange 410. The flange 410 includes springs 419 that provide inward force on the retainers 414. As described above with reference to FIG. 2, the inward pressure provided by the springs 419 causes the retainers 414 to engage with a groove on a base of a detachable cartridge system. When the buttons 413 are pressed inward by a user, the pressure exerted by the springs 419 on the retainers 414 decreases, which allows the flange to be removed from a spool assembly of a spinning reel.

Figure 5A:
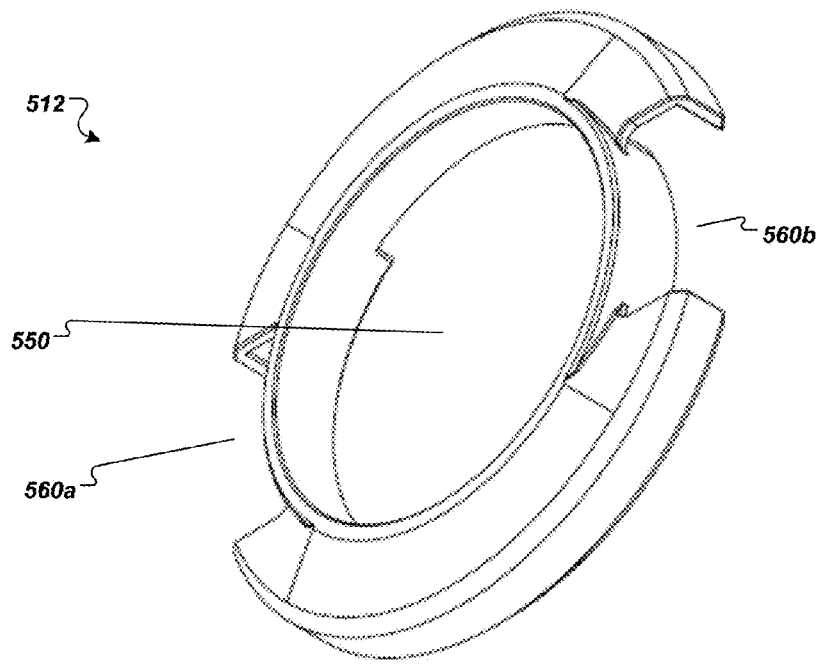
FIGS. 5A-5B are top and bottom perspective views of an example flange housing.
Figure 5B:
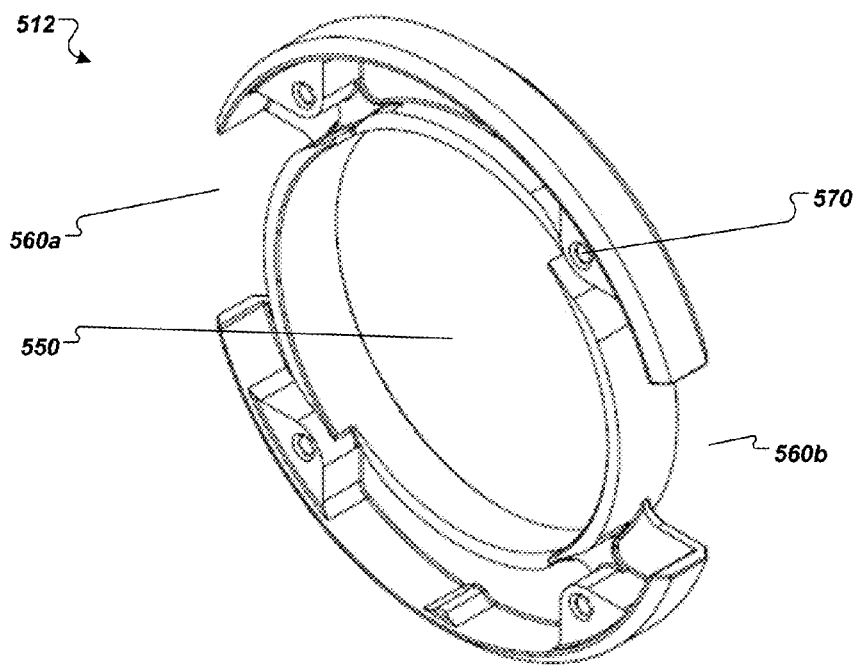

FIGS. 5A-5B are top and bottom perspective views of an example flange housing 512. In general, the flange housing 512 has an aperture 550 and a pair of corresponding recesses 560a-b that provide space for buttons. The flange housing 512 also includes holes 570 for receiving screws, which allow the flange housing 512 to be secured to a flange bottom.

Figure 6:
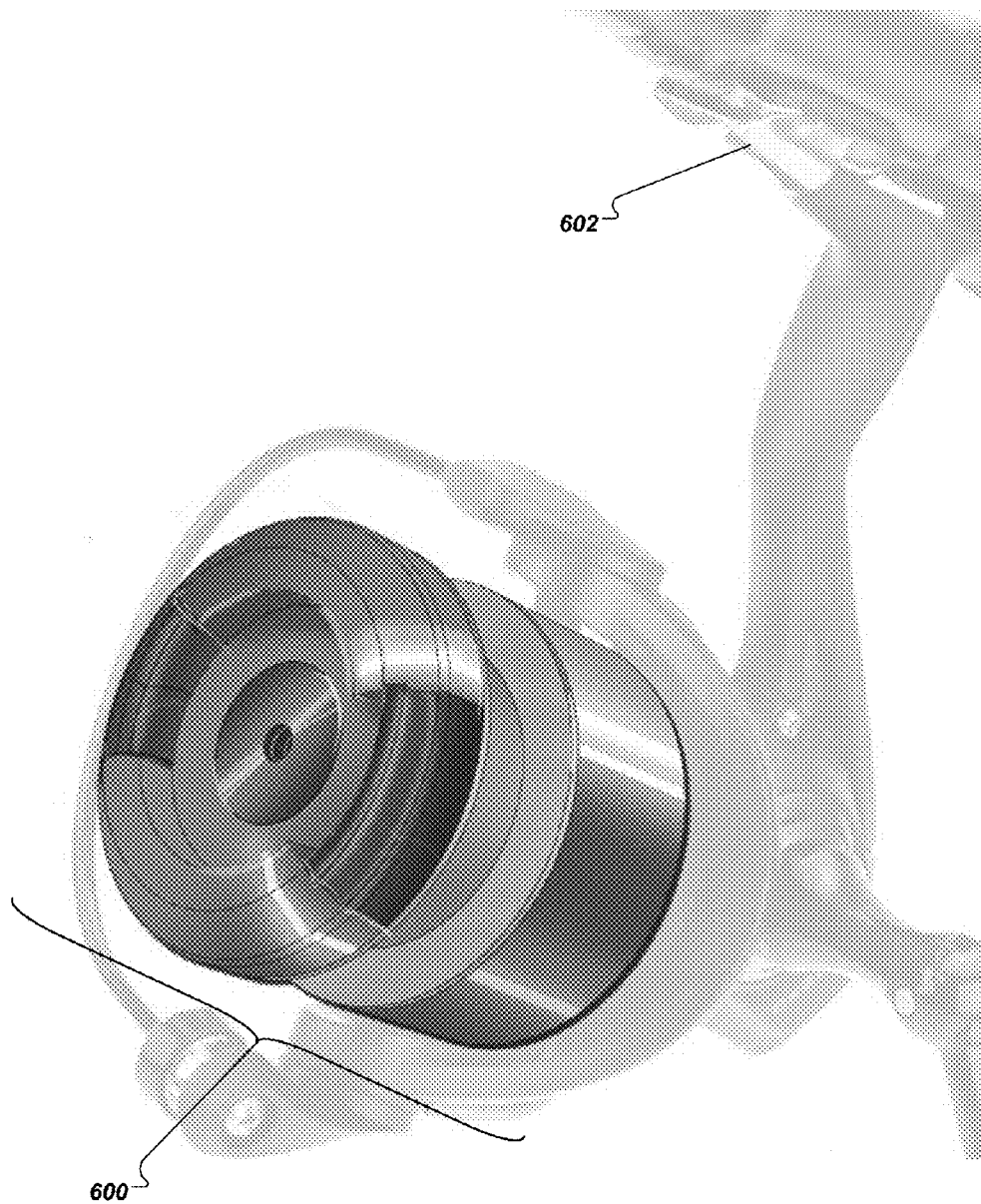
FIG. 6 illustrates a detachable line cartridge system mounted on a spinning reel.

FIG. 6 illustrates a detachable line cartridge system 600 mounted on a spinning reel 602. As shown, the detachable line cartridge system 600 is compatible with existing conventional spinning reels and can be installed with little effort and virtually no expertise.

Figure 7:
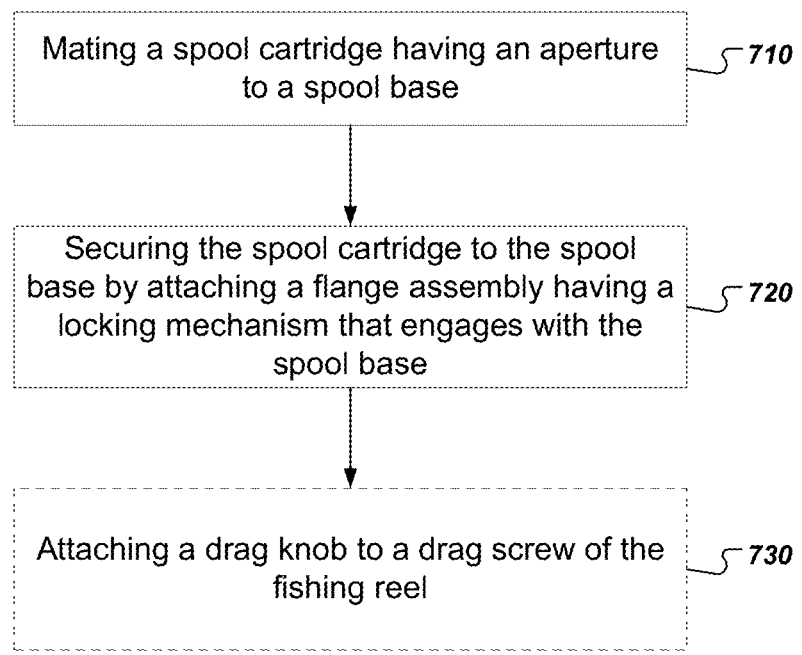
FIG. 7 is a flow chart of an example method for using a detachable line cartridge system.

FIG. 7 is a flow chart of an example method for using a detachable line cartridge system. The example method is typically performed by a user of the reel or by a manufacturer of the reel.

A line cartridge having an aperture is mated to a spool base (710). As described above, the spool base is configured to be compatible with conventional spinning reels.

The line cartridge is secured to the spool base by attaching a flange assembly having a locking mechanism that engages with the spool base (720). As described above, in some implementations, the locking mechanism has a pair of corresponding retainers that engage with a groove in the spool base. The engagement of the retainers to the groove can be maintained by an inward force applied to the retainers by a pair of corresponding springs in the flange assembly.

A drag knob is optionally attached to a shaft screw of the fishing reel (730). The shaft screw protrudes out the top of the flange assembly. Thus, the user can merely rotate the drag knob onto the shaft screw in order to adjust the drag of the spinning reel. This step is optional, as in some implementations the drag knob need not be removed in order to attach a new line cartridge.

In addition to the embodiments of the attached embodiments and the embodiments described above, the following embodiments are also innovative:

Embodiment 1 is a detachable line cartridge system comprising:
 a spool base; and
 a detachable flange assembly having an aperture and a locking mechanism that engages with the spool base, wherein the flange assembly is configured to secure a line cartridge to the spool base.

Embodiment 2 is the detachable line cartridge system of embodiment 1, further comprising a line cartridge having an aperture, wherein the line cartridge is configured to be mated to the spool base.

Embodiment 3 is the detachable line cartridge system of any one of embodiments 1-2, wherein the line cartridge is detachable from the spool base when the flange assembly is detached from the spool base.

Embodiment 4 is the detachable line cartridge system of any one of embodiments 1-3, wherein the locking mechanism of the flange assembly has a locked position and a release position.

Embodiment 5 is the detachable line cartridge system of embodiment 4, wherein transitioning the locking mechanism to the locked position causes one or more retainers of the flange assembly to engage a groove in the spool base.

Embodiment 6 is the detachable line cartridge system of any one of embodiments 4-5, wherein transitioning the locking mechanism from the locked position to the release position comprises pushing one or more buttons on the flange assembly.

Embodiment 7 is the detachable line cartridge system of any one of embodiments 1-6, wherein pushing one or more buttons on the flange assembly causes one or more retainers of the flange assembly to disengage from a groove in the spool base, thereby allowing the flange assembly and the line cartridge to be removed from the spool base.

Embodiment 8 is the detachable line cartridge system of any one of embodiments 1-7, wherein the locking mechanism comprises a pair of buttons on opposites sides of the flange assembly.

Embodiment 9 is the detachable line cartridge system of any one of embodiments 1-8, wherein the line cartridge holds prewound fishing line.

Embodiment 10 is a method comprising:
 mating a line cartridge having an aperture to a spool base attached to a fishing reel; and
 securing the line cartridge to the spool base by attaching a detachable flange having a locking mechanism that engages with the spool base.

Embodiment 11 is the method of embodiment 10, further comprising attaching a drag knob to a shaft screw of the fishing reel.

Embodiment 12 is the method of any one of embodiments 10-11, wherein securing the line cartridge to the spool base comprises transitioning the locking mechanism of the detachable flange from a release position to a locked position.

Embodiment 13 is the method of embodiment 12, wherein transitioning the locking mechanism to the locked position causes one or more retainers of the detachable flange to engage a groove in the spool base.

Embodiment 14 is the method of any one of embodiments 10-13, further comprising transitioning the locking mechanism of the detachable flange from a locked position to a release position.

Embodiment 15 is the method of embodiment 14, wherein transitioning the locking mechanism of the detachable flange from the locked position to the release position comprises pushing one or more buttons on the detachable flange.

Embodiment 16 is the method of embodiment 15, wherein pushing one or more buttons on the detachable flange causes one or more retainers of the detachable flange to disengage from a groove in the spool base.

Embodiment 17 is the method of any one of embodiments 10-16, wherein the line cartridge holds prewound fishing line.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A detachable line cartridge system for a spinning reel comprising:
   a spool base configured to be mounted to the spinning reel, the spinning reel having a rotor assembly configured to rotate around the spool base to wind line around a line cartridge secured to the spool base; and
   a detachable flange assembly having an aperture and a locking mechanism that engages with the spool base, wherein the detachable flange assembly is configured to secure the line cartridge to the spool base.

2. The detachable line cartridge system of claim 1, further comprising the line cartridge, wherein the line cartridge is configured to be mated to the spool base.

3. The detachable line cartridge system of claim 1, wherein the line cartridge is detachable from the spool base when the detachable flange assembly is detached from the spool base.

4. The detachable line cartridge system of claim 1, wherein the locking mechanism of the detachable flange assembly has a locked position and a release position.

5. The detachable line cartridge system of claim 4, wherein transitioning the locking mechanism to the locked position causes one or more retainers of the detachable flange assembly to engage a groove in the spool base.

6. The detachable line cartridge system of claim 4, wherein transitioning the locking mechanism from the locked position to the release position comprises pushing one or more buttons on the detachable flange assembly.

7. The detachable line cartridge system of claim 1, wherein pushing one or more buttons on the detachable flange assembly causes one or more retainers of the detachable flange assembly to disengage from a groove in the spool base, thereby allowing the detachable flange assembly and the line cartridge to be removed from the spool base.

8. The detachable line cartridge system of claim 1, wherein the locking mechanism comprises a pair of buttons on opposites sides of the flange assembly.

9. The detachable line cartridge system of claim 1, wherein the line cartridge holds prewound fishing line.

10. The detachable line cartridge system of claim 1, wherein the detachable flange assembly is configured to be rotationally fixed while the rotor of the rotor assembly rotates around the spool base of the spinning reel to wind line around the line cartridge.

11. The detachable line cartridge system of claim 10, wherein the spool base and the detachable flange assembly are configured to rotate by operation of a drag mechanism of the spinning reel due to tension on the line.

12. A method comprising:
    mating a line cartridge having an aperture to a spool base attached to a spinning reel, the spinning reel having a rotor assembly configured to rotate around the spool base to wind line around the line cartridge; and
    securing the line cartridge to the spool base of the spinning reel by attaching a detachable flange assembly to the spool base of the spinning reel, the detachable flange assembly having a locking mechanism configured to engage with the spool base of the spinning reel.

13. The method of claim 12, further comprising attaching a drag knob to a shaft screw protruding through the aperture of the detachable flange assembly.

14. The method of claim 12, wherein securing the line cartridge to the spool base of the spinning reel comprises transitioning the locking mechanism of the detachable flange assembly from a release position to a locked position.

15. The method of claim 14, wherein transitioning the locking mechanism to the locked position causes one or more retainers of the detachable flange assembly to engage a groove in the spool base of the spinning reel.

16. The method of claim 12, further comprising transitioning the locking mechanism of the detachable flange assembly from a locked position to a release position.

17. The method of claim 16, wherein transitioning the locking mechanism of the detachable flange assembly from the locked position to the release position comprises pushing one or more buttons on the detachable flange assembly.

18. The method of claim 17, wherein pushing one or more buttons on the detachable flange assembly causes one or more retainers of the detachable flange assembly to disengage from a groove in the spool base of the spinning reel.

19. The method of claim 12, wherein the line cartridge holds prewound fishing line.

20. The method of claim 12, wherein the detachable flange assembly is configured to be rotationally fixed while the rotor of the rotor assembly rotates around the spool base of the spinning reel to wind line around the line cartridge.

21. The method of claim 20, wherein the spool base and the detachable flange assembly are configured to rotate by operation of a drag mechanism of the spinning reel due to tension on the line.

* * * * *